Figure 3:
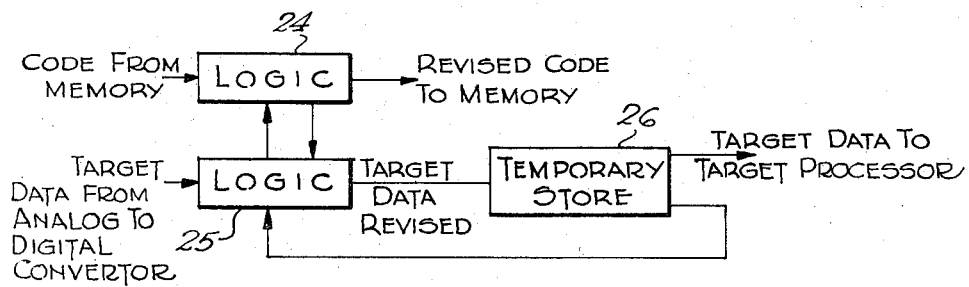

United States Patent [19]

Horton et al.

[11] 3,823,398
[45] July 9, 1974

[54] RADAR CROSS CORRELATOR

[75] Inventors: Donald J. Horton, Ottawa, Ontario; Martin L. Stanley-Jones, North Gower, Ontario, both of Canada

[73] Assignee: Canadian Patents and Development Limited, Ontario, Canada

[22] Filed: Oct. 10, 1972

[21] Appl. No.: 296,398

[30] Foreign Application Priority Data
Dec. 3, 1971  Canada.............................. 129260

[52] U.S. Cl. .................................................. 343/5 DP
[51] Int. Cl. ............................................. G01s 9/02
[58] Field of Search............................... 343/5 DP

[56] References Cited
UNITED STATES PATENTS

| | | | |
|---|---|---|---|
| 3,353,177 | 11/1967 | Wilmot............................ | 343/5 DP |
| 3,579,237 | 5/1971 | Steingart et al. ................. | 343/5 DP |
| 3,725,916 | 4/1973 | Cutler.............................. | 343/5 DP |
| 3,727,215 | 4/1973 | Wilmot............................ | 343/5 DP |
| 3,731,304 | 5/1973 | Caspers et al..................... | 343/5 DP |

Primary Examiner—Malcolm F. Hubler
Attorney, Agent, or Firm—Alex. E. MacRae & Co.

[57] ABSTRACT

Apparatus for cross correlating radar returns in digital form in a radar system where a predetermined number of radar return signals at the same range from successive scans are required to provide a target display, includes a memory having time slots for storing the returns in digital form. The time slots represent consecutive units of range. A fine range is provided within each time slot so that a critical area is defined adjacent each boundary of a time slot. If a return falls within a critical area, the data representing this return is compared with the data for the corresponding time slot of the previous scan, and if movement has taken place between the critical area on one side of the boundary to the critical area on the other side of the boundary the latest return is placed in the same location as the previous return.

8 Claims, 5 Drawing Figures

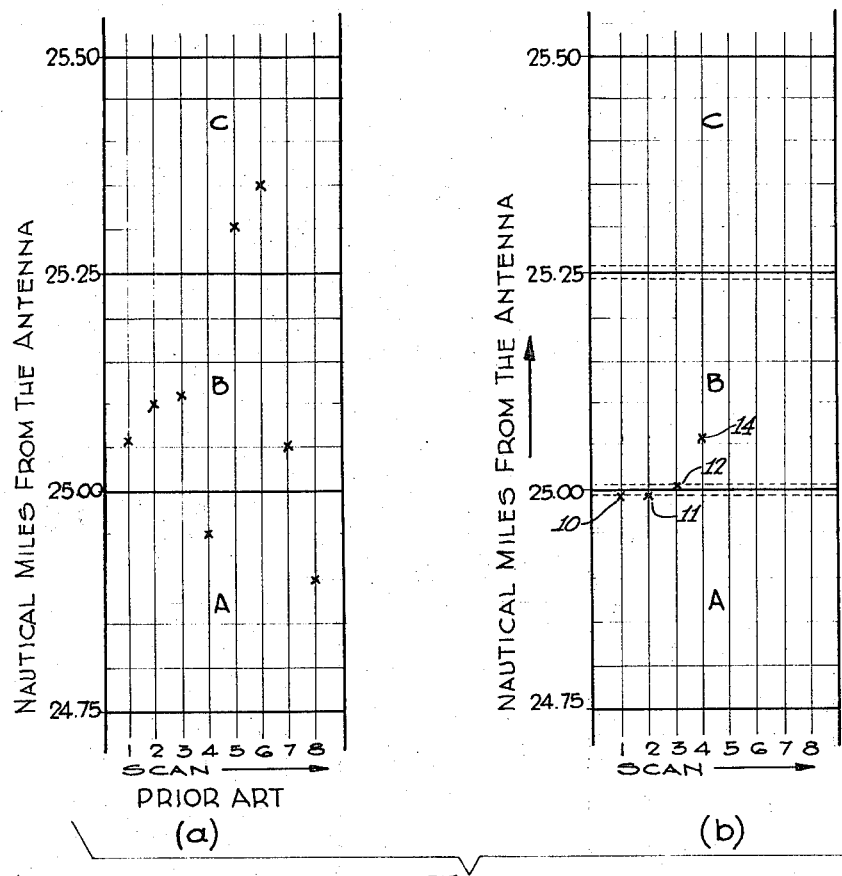
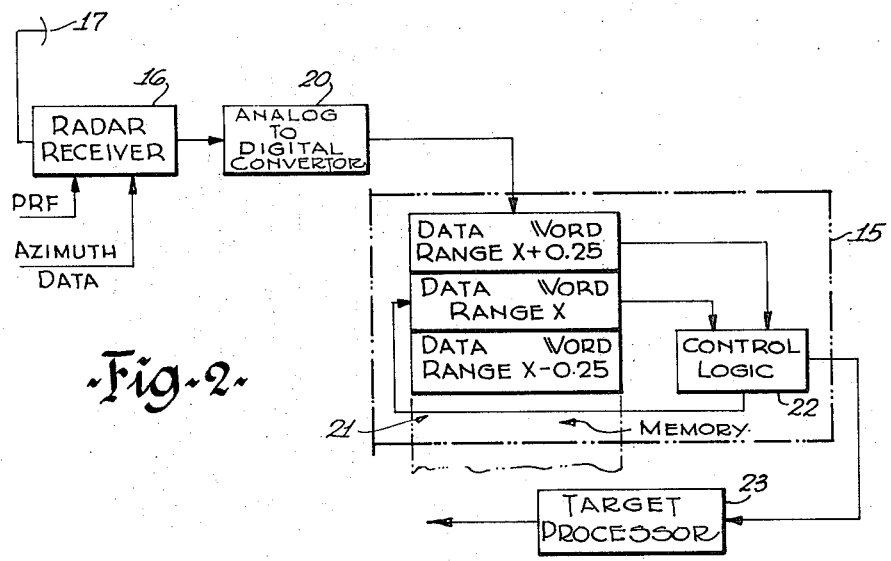
Fig-1-
Fig-2-

RADAR CROSS CORRELATOR

This invention relates to apparatus for cross correlating radar returns, and in particular it relates to apparatus for cross correlating radar return signals which are in digital form.

It is convenient to convert analog radar returns into digital form. The digitized radar return signals are readily processed by computers and may be transmitted over telephone lines for long distances. The technique of converting radar returns to digital form is well known in air traffic control surveillance radar, for example.

Radar apparatus of this type is frequently associated with an electronic digital computer whose memory is used to store blocks of data representing time slots for radar returns. Thus, a scan may be divided into a predetermined number of time slots representing target ranges. For example, a scan may be divided into a series of time slots of 3.09 microseconds duration, where each slot is equivalent to one quarter of a nautical mile.

A radar target return is stored in the computer memory in a particular time slot for a particular azimuth. This time slot may be accessed as required and the target data processed. However there is usually some gaussian noise added to the returning signal and this introduces difficulty when target detection is attempted on a single return. It has therefore become common practice to consider several successive scans. If the number of radar signal returns for time slots representing a particular range in a number of successive scans, exceeds a predetermined number then a target is declared. This reduces the effects caused by noise but causes another problem.

The problem referred to above arises when a return is near the edge of a time slot, that is when the target is at a range such that the detected signal return would be allocated to one time slot but a very minor change would cause it to be allocated to an adjacent time slot. Receiver noise effects and/or atmospheric propagation anomalies may cause target scintillation resulting in the location of the return changing from one time slot to an adjacent time slot or range cell. Because a target is declared only if a minimum number of returns is allocated to a particular time slot or range cell for a predetermined number of scans, it will be seen that if the position of a return moves between two cells for the predetermined number of scans then the required number of returns may not be available for a target to be declared. Thus, it is possible to have a loss of target detection.

It is known to treat the loss of target detection in two ways. The first way is to accept the possible loss of target detection. This is obviously not desirable. The second way is to consider returns falling into adjacent time slots. This may be described by considering a series of three adjacent time slots or range cells which can be designated, in order, as A, B and C. If a target is to be detected in time slot B, then the returns in both time slot A and time slot C are counted for the predetermined number of scans and added to the number of returns counted for B. The adding of counts in adjacent cells avoids loss of detection near a range cell boundary but it introduces another problem which may be almost as significant. This problem occurs when two targets are relatively close. If we now consider another target in, say, a time slot E where time slots D, E and F are adjacent and in order and slots C and D are adjacent, then there are two targets. Target counts appear in time slot B and time slot E. There may be counts in A and C which are added to B, and there may be counts in D and F which are added to E. Thus there would be, in these circumstances a target declared in B and in E. However, there could be counts in B, C and D. The counts in B and D could be added to C and a target declared in C. Similarly there could be counts in C, D and E resulting in a target being declared in D. Thus, it is possible that the logic in the apparatus could generate more than the two targets which exist and this would depend on target scintillation, noise and weather returns. The effect is likely to increase as the distance between two targets decreases.

The present invention is an improvement on the above apparatus. It avoids loss of detection near a range cell boundary and overcomes the problem of more than two targets being declared when two targets are in close proximity.

Very briefly the present invention divides each cell into a number of smaller time divisions which may be termed as representing fine range where the cell represents a coarse range. If a return falls within the small subdivision adjacent a cell boundary, the data representing this return is compared with the data for the corresponding range cell of the previous scan, and if movement across a cell boundary to the small subdivision on the other side is detected the data for the latest return is placed at the same location as the previous scan. Provision is made to remember the type of manipulation done to the previous scan. By limiting the critical area to a small portion around a range cell boundary there is no confusion when targets are separated by a small distance comparable to the distance represented by one or two range cells.

Figure 5:
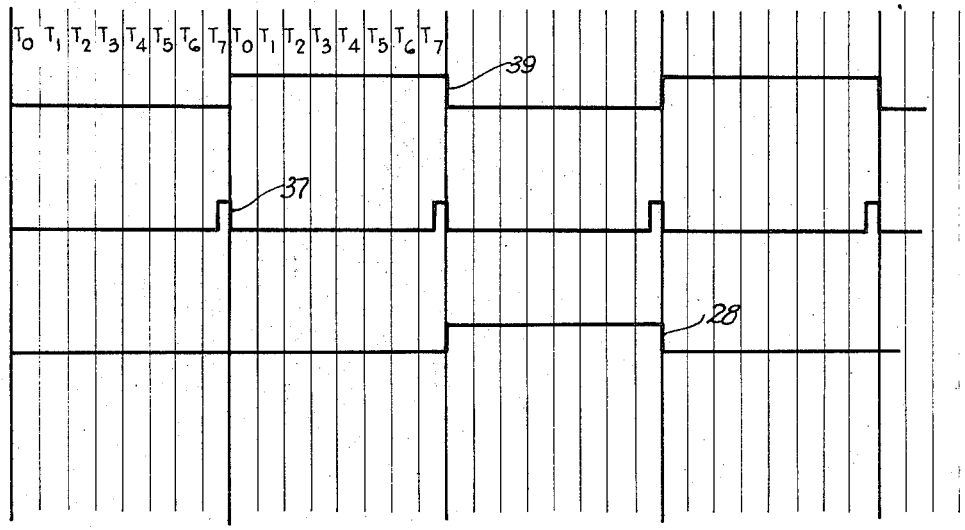
Figure 4:
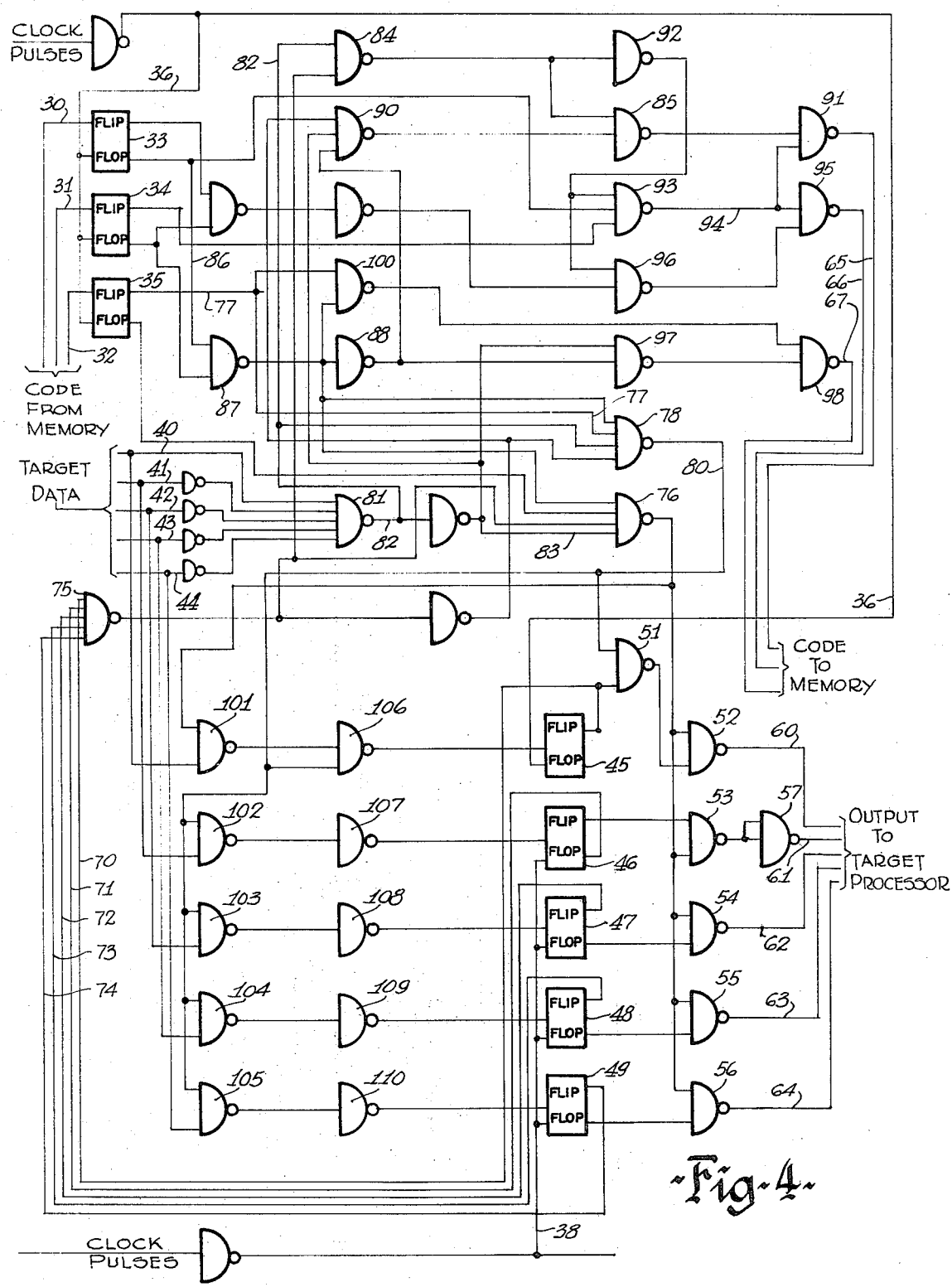

The invention is described hereinafter with reference to the accompanying drawings, in which FIG. 1(a) and (b) are sketches useful in describing the operation of the invention, FIG. 2 is a block diagram showing the apparatus of the invention, FIG. 3 is a block diagram representing a portion of the circuitry of FIG. 2, FIG. 4 is a schematic logic diagram showing one example of circuitry suitable for use in an embodiment of the invention, and FIG. 5 is a timing diagram useful in describing the operation of the circuit of FIG. 3.

Referring first to FIG. 1(a) and (b) there is shown a representation of three range cells A, B and C in a series of such cells. The range is indicated along the left in nautical miles from the antenna, and the abscissa represents a number of scans, shown as 8 scans. Thus, cell A represents a range of from 24.75 nautical miles to 25.00 nautical miles, for a series of eight scans, cell B represents a range of from 25.00 nautical miles to 25.25 nautical miles for the same series of eight scans, and so on. A range cell representing one quarter of a nautical mile is shown as an example because it is frequently used in radar apparatus used in air traffic control.

As was previously discussed, it is known to combine the returns in adjacent cells and to declare a target based on the combined count. In FIG. 1(a) a number of returns (each return being represented by a cross) are shown distributed in cells A, B and C. In the prior art these returns might be combined to declare a target in cell B. It will be seen that a distribution of returns such as caused by two targets separated by one half nautical mile might cause more than two targets to be displayed.

In the present invention a critical area or region is created at each cell boundary. Analysis of radar echoes shows that the actual movement from scan to scan is relatively small and for a typical 200 nautical mile radar can be expected to be largely within plus or minus 0.380 microseconds (i.e., plus or minus 1/32 nautical mile). Therefore a critical area of plus or minus 1/32 nautical mile is suitable. A critical area of plus or minus 1/16 nautical mile has also been found to be satisfactory. It will, of course, be apparent that other distances for the critical area or fine range could be suitable for other types of radar apparatus under other conditions. The critical area at one boundary of a time slot should not, of course, exceed 50 percent of the time slot or there will be an overlap of the critical areas. The present invention will be described using a critical area of plus or minus 1/32 nautical mile for convenience.

With the critical area established, it is only necessary to look in an adjacent cell if a return is found to be within 1/32 nautical mile of a boundary. If on the subsequent scan the return is in the same cell it is of course counted. If on the subsequent scan the return is not in the same cell, the adjacent critical area in the adjacent cell is investigated and if there is a return it is considered to be for the same target as the previous scan and is placed at the same location as the return in the previous scan. Any return in the adjacent cell outside the critical area is considered to belong to another target. In FIG. 1(b) there are returns indicated at 10, 11, 12 and 14. For example, the return at 12 would be considered to be for the same target as the return at 11 and would be synthetically placed in storage at the same location. The return at 14 would be considered as being for a different target than the return at 10, 11 or 12.

Referring now to FIG. 2 there is shown in block form part of a radar receiver with apparatus according to the invention shown generally within dashed line 15. A radar receiver 16 is connected to antenna 17 to receive radar returns or echoes. The radar receiver 17 also has provision to receive a representation of the pulse recurrent frequency (indicated PRF) and a representation of azimuth data. These signals are available from portions of the radar apparatus not shown. The signals representing radar returns are applied to an analog to digital convertor 20 which converts the analog signals to digital form. The digital data or digitized data representing the radar returns is applied to a memory 21. Only a portion of memory 21 is shown for convenience. The portion shown includes locations for storing three data words, one for range $x - 0.25$ nautical miles, one for $x$ nautical miles, and one for $x + 0.25$ nautical miles. The memory includes, at each portion, provision for storing a code representing the history of returns so that the logic circuitry can take this history into account. The locations for storing the data words representing returns and associated code are connected to control logic 22.

The control logic 22 holds the information from a particular range cell until the data from the next range cell is received. Thus, the logic circuitry 22 has available (a) target data from the previous range cell, (b) a code representing current history, and (c) target data from the current range cell. The control logic circuitry 22 revises the code, and if necessary revises the target data, and stores the resulting code and target data in memory for the next cycle. There is an output from control logic 22 to a target processor 23. The target data is thus applied to the target processor 23 which provides a target display signal for a radar display. The target processor is a known unit and one of its functions is to determine if a sufficient number of hits or radar returns have been received to declare a target.

The control logic may be perhaps better understood with reference to FIG. 3 which provides more detail. In FIG. 3 the logic circuitry is shown in two parts, 24 and 25. Logic circuitry 24 receives a code signal from memory, revises it if necessary depending on signals from logic circuitry 25, and provides as an input to memory a new code. Logic circuitry 25 receives two sets of data representing target information. For example, this data may comprise one bit representing the presence or absence of a return and perhaps three bits representing fine range (i.e., representing 1/32, 1/16 and 1/8 nautical mile). One set of target data is from the analog to digital convertor and represents the current range cell data, and one set is from a temporary store 26 representing the previous range cell data. The data from the temporary store 26 may, at this time be provided as an output to the target processor 23.

The logic circuitry 25 thus has two sets of target data which it compares. If the target is not in a critical area, there is no target revision and the target data from logic circuitry 25 is passed to temporary store 26 where it remains for a cycle and is then applied to the target processor 23. If the new target is in a critical area, the target data is compared with the previous target data, and if necessary the target data is revised to place it in the correct critical area and passed to temporary store 26. There is a signal from logic circuitry 25 applied to logic circuitry 24 to be used to revise the code as necessary.

Radar apparatus incorporating the cross correlating means of this invention makes use of a fine range as well as a coarse range. The fine range provides a critical area near the boundary of a storage cell which represents a unit of the coarse range. The critical area is used to ascertain if a target has moved across a boundary from the critical area on one side to the critical area on the other. If so the target data is corrected. A code is used to store current history of the targets.

It is believed the description so far provides an adequate understanding of the invention. Various circuit arrangements can be used in the invention. One such circuit arrangement is shown in FIG. 4 and will be described briefly herein. It will be realized that this circuitry is only one example of suitable circuitry and persons skilled in the art will be aware of many equivalents and variations.

The circuitry of FIG. 4 makes use of a three bit code for storing information on target history. The bits in the above code may be referred to as C1, C2 and C4. Other codes could, of course, be used. The code used would be suitable for a particular computer configuration. As an aid in understanding FIG. 4, the code is given below.

| Code | Description |
|------|-------------|
| 0 | No hit in target 2, no history (idle) |
| 1 | A hit, target 2 |
| 2 | No hit for target 2 this scan, but a hit in the previous scan |
| 3 | No hit for target 2 this scan, no hit previous scan, but a hit in the scan prior to that |
| 4 | No hit in target 1, no history (idle) |
| 5 | A hit, target 1 |
| 6 | No hit for target 1 this scan, but a hit in the previous scan |
| 7 | No hit for target 1 this scan, no hit the previous scan, but a hit in the scan prior to that |

It will be seen that code 0 and code 4 are equivalent. For convenience provision has been made for targets 1 and 2 where target 1 is farther away. The code is provided mainly to remember changes from the critical area in one time slot to the critical area in an adjacent time slot. For example, referring for the moment to the timing diagram of FIG. 5 there are shown four cycles defined by a waveform 39. Each cycle may be considered as a time slot equivalent and is subdivided into eight parts each representing 1/32 nautical mile and designated $T_o$ to $T_7$. Thus, if a radar return signal is located in any one of the fine range time divisions $T_o$ through $T_7$ (where the critical areas are $T_o$ and $T_7$) then the logic will provide the appropriate code as shown on page 11.

It will be apparent that a code could be used which accommodated more past history, that is which recorded hits in preceding three or more scans.

Very briefly, referring to both FIGS. 4 and 5, the code from memory is applied by conductors 30, 31 and 32 to three flip flops 33, 34 and 35 respectively. Timing or clock pulses are present on conductor 36 and these clock each of the flip flops at the beginning of each cycle. A timing pulse is shown at 37 in FIG. 5. Thus, at the beginning of each cycle the code from the previous scan is moved into flip flops 33 – 35 and retained there for the remainder of the cycle. Similarly at the beginning of each cycle target data is available on conductors 40 – 44. The waveform 28 in FIG. 5 is an example of target data as it would appear on any conductor. The pulse extends the full cycle. The target data comprises a hit/no hit signal on conductor 40; an additional bit of information on conductor 41 as will be described shortly; and fine range information on conductors 42, 43 and 44 representing 1/32, 1/16 and ⅛ nautical mile.

It has been found desirable under certain circumstances to disregard a return having a duration greater than a predetermined length. Thus a signal on conductor 41 is provided to do this.

Target data from the previous cycle is being held in flip flops 45 – 49, that is a hit/no hit representation in flip flop 45; an excess target return representation in flip flop 46; and fine range information in flip flops 47 – 49. The target data from the previous cycle was moved into these flip flops at the end of the previous cycle by timing pulses on conductors 36 and 38. The target data being held in flip flops 45 – 49 may be revised by NAND gates 51 – 57 before being provided as an output for the target processor on conductors 60 – 64.

At the end of a cycle the revised code is available on conductors 65 – 67 as shown.

The operation of FIG. 4 will be better understood by reference to the following truth table and to the succeeding example.

| PRESENT CODE | TARGET TWO | TARGET ONE | REVISED CODE | IDLE |
|---|---|---|---|---|
| 0 | 0 | 0 | 0 | 1 |
| 1 | 0 | 0 | 2 | |
| 2 | 0 | 0 | 3 | |
| 3 | 0 | 0 | 0 | |
| 4 | 0 | 0 | 0 | 1 |
| 5 | 0 | 0 | 6 | |
| 6 | 0 | 0 | 7 | |
| 7 | 0 | 0 | 4 | |
| 0 | 1 | 0 | 1 | 1 |
| 1 | 1 | 0 | 1 | |
| 2 | 1 | 0 | 1 | |
| 3 | 1 | 0 | 1 | |
| 4 | 1 | 0 | 1 | 1 |
| 5 | 1 | 0 | 5 | |
| 6 | 1 | 0 | 5 | |
| 7 | 1 | 0 | 5 | |
| 0 | 0 | 1 | 5 | 1 |
| 1 | 0 | 1 | 1 | |
| 2 | 0 | 1 | 1 | |
| 3 | 0 | 1 | 1 | |
| 4 | 0 | 1 | 5 | 1 |
| 5 | 0 | 1 | 5 | |
| 6 | 0 | 1 | 5 | |
| 7 | 0 | 1 | 5 | |
| 0 | 1 | 1 | 4 | 1 |
| 1 | 1 | 1 | 1 | |
| 2 | 1 | 1 | 1 | |
| 3 | 1 | 1 | 1 | |
| 4 | 1 | 1 | 4 | 1 |
| 5 | 1 | 1 | 5 | |
| 6 | 1 | 1 | 5 | |
| 7 | 1 | 1 | 5 | |

Referring briefly to the truth table, it will be seen that if there is no target hit in a critical region representing either target one or target two, codes 0 and 4 remain at idle while codes 1, 2, 5 and 6 are revised as codes 2, 3, 6 and 7 respectively because there is no further target information. Similarly codes 3 and 7 are revised to 0 and 4, the idle codes, because of a lack of current target information. It is believed that no further explanation of the truth table is necessary except perhaps in the last portion where there is a target hit in a critical area for both target one and target two. When there is no history (code 0 or code 4) the two hits are disregarded, there is no indication of which is valid. If the code is a code 1 representing a hit in target two it remains as code 1 with the target one hit being disregarded. Similarly, if the code is code 5 it remains as 5 with the target two hit being disregarded.

An example is described hereinafter using a typical set of input data and showing corresponding output data to clarify the operation of the circuitry of FIG. 4.

Suppose, as an example we assume the following conditions a. the code in memory is a code 5 (C1, C4)

b. the target data being held in flip flops 45 – 49 is for a target $T_7$ (FIG. 5)

c. the new target data is a 0, that is a miss in this cell because in this example the target has changed to the critical area ($T_o$) in the next cell In other words, referring to a high level as 1 and a low level as 0, there will be a. on conductors 30, 31 and 32 a 1, 0 and 1 respectively b. in gated flip flops 45 – 49 an output of 1, 0, 1, 1 and 1 respectively c. on conductors 40 – 44 a 0, 0, 0, 0 and 0 respectively.

Referring to the truth table it will be seen that for the conditions given above the revised code to memory on conductors 65, 66 and 67 should still be a code 5 represented by a 1, 0 and 1 respectively; that there should be a target miss or a 0 on conductor 60; and that there should be at the inputs to gates 45 – 49, ready for the next cycle, an indication of a target in $T_o$, that is, a 1, 0, 0, 0, and 0 respectively.

Now to follow the circuitry through for the input conditions given, because of the condition of flip flops 45 – 49 there will be a 1 on each of the conductors 70 – 74 and these are inputs to NAND gate 75. The output of NAND gate 75 will be 0 and this is applied as an input to NAND gate 76 which results in a 1 output from gate 76. The output from NAND gate 76 is applied as an input to NAND gates 52 – 56. It will be recalled that there is a 1 on conductor 32 which will condition flip flop 35 so that there is a 1 on conductor 77 applied as one input to NAND gate 78; there is a 1 on conductor 30 which will condition flip flop 33 so that there is a 0 on conductor 86, applied to NAND gate 87, and a 1 output from NAND gate 87 applied as another input to NAND gate 78; there is a 0 output from NAND gate 75, inverted and the resulting 1 applied as another input to NAND gate 78; and there is a 0 on conductor 40, applied as an input to NAND gate 81 so that the output from NAND gate 81 is a 1 which is applied as an input to NAND gate 78. Thus, all inputs to NAND gate 78 are 1 resulting in a 0 output which is applied as an input to NAND gate 51. The output from NAND gate 51 is therefore a 1 which is applied as an input to NAND gate 52. Thus there is a 1 at each input to NAND gate 52 and the output on conductor 60 is 0. For the conditions given this is correct. It does not matter what signals are on conductors 61 – 64 as this is not significant when there is a miss (i.e., a no target signal on conductor 60).

Considering now what happens to the code from memory, it will be recalled the output from NAND gate 75 is 0 and this is applied as one input to NAND gate 84 causing a 1 output which, in turn is applied as an input to NAND gate 85. It will also be recalled that because there is a 0 on conductor 40 there will be a 1 output from NAND gate 81 which is inverted and appears on conductor 83 as 0. This is applied as an input to NAND gate 90 causing a 1 output from gate 90 which is applied as the other input to NAND gate 85. Thus, there is a 1 at each input of NAND gate 85 and a 0 output and this is applied to NAND gate 91. This results in a 1 output from NAND gate 91 and this appears on conductor 65. This is correct.

Because of the condition of flip flop 33 there is a 0 on conductor 86 and this 0 is applied as an input to NAND gate 93 and thus a 1 on conductor 94 which is an input to NAND gate 96. It will be recalled the output from NAND gate 84 is a 1 and this is inverted by inverter 92 to a 0 which is applied as an input to NAND gate 93. There is a 1 output from NAND gate 93 which is applied as the other input to NAND gate 96. Thus, there is a 1 at each input to NAND gate 96 and a 0 output on conductor 66. Again this is correct.

It will be recalled there is a 0 on conductor 86 which is applied as an input to NAND gate 87 resulting in a 1 output which is applied as an input to NAND gate 100. Because of the condition of flip flop 35 there is a 1 on conductor 77 which is applied as the other input to NAND gate 100. The output from NAND gate 100 is 0 and this is applied as an input to NAND gate 98 resulting in a 1 output on conductor 67. Thus, the output code is a 5 as was previously discussed as being the correct code.

We are also interested in the signals which are developed for application to flip flops 45 – 49 to be clocked in at the end of the present cycle and held there for the next cycle. There is a 0 on each of conductors 40 – 44 which is applied as an input to NAND gates 101 – 105. This causes outputs from these NAND gates to be 1. The outputs from NAND gates 102 – 105 are inverted by inverters 107 – 110 so that the outputs therefrom are all 0. The output from NAND gate 101 is applied as an input to NAND gate 106. The other input is a 0 on conductor 80 from NAND gate 78 as was previously discussed. Therefore the output from NAND gate 106 is a 1 representing a hit. The outputs from gates 108 – 110 represent the fine range location of $T_o$. Thus, it will be seen that the data waiting to be placed in flip flops 45 – 49 is a hit at location $T_o$. The target return or hit from $T_7$ in has thus been changed across a boundary to $T_o$ in the next cell.

It is believed that the example described in conjunction with the truth table will provide an adequate understanding of the invention.

The embodiments of the invention in which an exclusive property or privilege is claimed are defined as follows:

1. Apparatus for correlating radar return signals comprising
   a memory having time slots for storing radar return signals in digital form according to the range represented by the return,
   adjacent time slots representing consecutive units of range having boundaries therebetween,
   means to locate each radar return signal at one of a plurality of time divisions within the time slot according to range,
   means to define a predetermined ciritical time period within said time slot representing at least one of said time divisions adjacent a boundary,
   range comparing means for comparing the range of said return signal with the range of a corresponding preceding return signal upon initiation by a return signal being located in said critical time period, and
   range signal transferring means for transferring the memory location of said return signal to a location representing a range corresponding to that of said preceding return when said preceding return signal is in an adjacent critical time period of the adjacent time slot.

2. Apparatus as defined in claim 1 wherein said means to locate each radar return signal at one of a plurality of time divisions comprises a plurality of bits accompanying the radar return signal representing the respective time division.

3. Apparatus as defined in claim 1 and further including a code generating means for generating a code representative of the history of a radar return signal.

4. Apparatus as defined in claim 3 in which the code generating means generates a code representing at least one of conditions in the group comprising (a) no radar return signal in a critical time period, (b) a radar return signal occurring in a critical time period, (c) no radar return signal occurring in a critical time period in the present scan but a radar return signal occurring in a critical time period in the previous scan, and (d) no radar return signal occurring in a critical time period in the present scan or in the previous scan but a radar return signal occurring in a critical time period in the scan previous to that.

5. Apparatus for correlating radar return signals in digital form in a radar system where a predetermined number of radar return signals at the same range from successive scans are required to provide a target display, comprising a memory having time slots for storing radar return signals in digital form according to the range represented by the return, adjacent time slots representing consecutive units of range having boundaries therebetween, means providing for each return a signal representing one of a plurality of time divisions within a time slot according to a fine range within said time slot, means defining a critical time period adjacent each boundary of a time slot, each critical time period representing at least one of said time divisions, a temporary storage unit for storing data representing a radar return signal for comparison with data representing a succeeding radar return signal, range data comparing means for comparing data representing successive radar return signals upon initiation by a return signal being located in a critical time period, range signal transferring means for transferring the memory location of a return signal to a location representing a range corresponding to that of a preceding return signal when said preceding return signal is in an adjacent critical time period in the adjacent time slot, and means providing an output from said memory for use in providing a target display.

6. Apparatus as defined in claim 5 and further including a code generating means associated with each time slot for generating a code representative of the history of a radar return signal.

7. Apparatus as defined in claim 6 in which the code generating means generates a code representing at least one of the conditions in the group comprising (a) no radar return signal in a critical time period for at least three scans, (b) a radar return signal in a first critical time period adjacent a first boundary, (c) no radar return signal occurring in said first critical time period in the present scan but a radar return signal in said first critical time period of the previous scan, (d) no radar return signal occurring in said first critical time period in the present scan or in the previous scan but a radar return signal in said first critical time period in the scan previous to that, (e) a radar return signal in a second critical time period adjacent said first boundary, (f) no radar return signal occurring in said second critical time period in the present scan but a radar return signal in said second critical time period of the previous scan, and (g) no radar return signal occurring in said second critical time period in the present scan or in the previous scan but a radar return signal in said second critical time period in the scan previous to that.

8. Apparatus as defined in claim 7 in which each time slot represents one quarter of a nautical mile and each time division therein represents one thirty second of a nautical mile.

* * * * *